(12) United States Patent
Kwon

(10) Patent No.: US 7,336,480 B2
(45) Date of Patent: Feb. 26, 2008

(54) COMPUTER SYSTEM

(75) Inventor: Hyok-soo Kwon, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 114 days.

(21) Appl. No.: 11/274,186

(22) Filed: Nov. 16, 2005

(65) Prior Publication Data

US 2006/0126281 A1      Jun. 15, 2006

(30) Foreign Application Priority Data

Dec. 14, 2004   (KR) ...................... 10-2004-0105523

(51) Int. Cl.
    *G01F 1/16*      (2006.01)
(52) U.S. Cl. .................. 361/681; 361/680; 361/683; 248/917; 455/575.1
(58) Field of Classification Search ........ 361/681–686, 361/676, 679, 688; 312/223.1, 223.2, 223.3, 312/208.1; 400/641, 689, 682, 693; 248/455, 248/456, 917–920, 923; 345/168, 169, 156, 345/170–172; 455/90, 575, 556.1
See application file for complete search history.

(56) References Cited

U.S. PATENT DOCUMENTS

| | | | | |
|---|---|---|---|---|
| 6,185,096 | B1 * | 2/2001 | Helot et al. ................. | 361/686 |
| 6,266,241 | B1 | 7/2001 | Van Brocklin | |
| 6,556,435 | B1 | 4/2003 | Helot | |
| 6,751,089 | B2 * | 6/2004 | Hsieh ......................... | 361/680 |
| 6,788,527 | B2 * | 9/2004 | Doczy et al. ............... | 361/680 |
| 6,903,927 | B2 * | 6/2005 | Anlauff ...................... | 361/681 |
| 6,922,333 | B2 * | 7/2005 | Weng et al. ................ | 361/680 |
| 6,975,507 | B2 * | 12/2005 | Wang et al. ................ | 361/683 |
| 7,059,576 | B2 * | 6/2006 | Chen et al. ................. | 248/371 |
| 7,109,893 | B2 * | 9/2006 | Chen .......................... | 341/22 |
| 7,126,588 | B2 * | 10/2006 | Oakley ....................... | 345/169 |
| 2005/0206615 | A1 * | 9/2005 | Tanimoto et al. .......... | 345/156 |

FOREIGN PATENT DOCUMENTS

| | | |
|---|---|---|
| JP | 10-228333 | 8/1998 |
| JP | 2003-058276 | 2/2003 |
| JP | 02004178540 A * | 6/2004 |
| KR | 1998-020220 | 7/1998 |

* cited by examiner

*Primary Examiner*—Michael Datskovskiy
(74) *Attorney, Agent, or Firm*—Roylance, Abrams, Berdo & Goodman, L.L.P.

(57) ABSTRACT

A computer system includes a computer having a computer main body and a display main body. The computer main body is formed with a keyboard accommodating part that detachably accommodates a keyboard therein. The display main body has a screen that displays an image thereon and is foldable against the computer main body. A supporting unit is detachably coupled to the keyboard accommodating part and supports the computer on an installation surface in a position that the display main body of the computer is folded onto the computer main body and exposes the screen to the outside.

17 Claims, 9 Drawing Sheets

COMPUTER SYSTEM

CROSS-REFERENCE TO RELATED APPLICATIONS

This application claims the benefit under 35 U.S.C. § 119(a) of Korean Patent Application No. 2004-0105523, filed on Dec. 14, 2004, in the Korean Intellectual Property Office, the entire disclosure of which is hereby incorporated by reference.

BACKGROUND OF THE INVENTION

1. Field of the Invention

The present invention relates to a computer system. More particularly, the present invention relates to a computer system in which a display may be folded to expose its screen to the outside and then the computer system may be installed in a supporting unit, thereby enhancing the utility of the computer system.

2. Description of the Related Art

Generally, computers are classified as desktop computers that are disposed on an installation surface, such as a table, and portable computers that are usable anywhere, for example, even while being carried.

Portable computers have excellent mobility and are readily carried. However, it is inconvenient to use the portable computer on an installation surface, such as a table like the desktop computers, so that the utility of the portable computer is substantially deteriorated.

As an example of enhancing the utility of the portable computer, a docking station has been disclosed in U.S. Pat. No. 6,556,435, in which a mobile computing device having a screen folded to face frontwards is installed.

The docking station includes a supporting plate seated on the installation surface, a receiving tray in which the mobile computing device having a screen folded to face frontwards is installed, an arm connecting the supporting plate with the receiving tray, and a hinge rotatably connecting the arm with the supporting plate.

Thus, the mobile computing device having a screen folded to face frontwards is seated on the receiving tray, and then the viewing angle of the mobile computing device installed in the docking station is controlled by lifting the receiving tray upwardly and downwardly with respect to the supporting plate.

However, such combination between the docking station and the mobile computing device is not enough to satisfy a user's various demands (for example, a user wants to use the portable computer for both its original purpose and desktop purpose).

To satisfy a user's various demands, a need exists for a computer system in which a portable computer is not only used for its original purpose but also used like a desktop computer seated on the installation surface, such as a table.

Accordingly, a need exists for an improved portable computer that is easily usable in both desktop and portable configurations.

SUMMARY OF THE INVENTION

Accordingly, it is an aspect of the present invention to provide a computer system in which a display may be folded to expose its screen to the outside and then the computer system may be installed in a supporting unit, thereby enhancing its utility.

The foregoing and other aspects of the present invention are also achieved by providing a computer system including a computer having a computer main body formed with a keyboard accommodating part that detachably accommodates a keyboard therein. A display main body has a screen that displays a picture thereon and is foldable against the computer main body. A supporting unit is detachably coupled to the keyboard accommodating part, and supports the computer against an installation surface in a position that the display main body of the computer is folded onto the computer main body and exposes the screen to the outside.

According to an aspect of the present invention, the computer system further includes a coupling unit that detachably couples the computer with the supporting unit. The coupling unit includes a projection part provided in one of the supporting unit and the keyboard accommodating part. A projection holding part is provided in the other one of the supporting unit and the keyboard accommodating part to be coupled with the projection.

According to an aspect of the present invention, one of the projection part and the projection holding part includes a movable hook being movable between a locking position and a releasing position, and the other one has a hook coupling portion adapted to be coupled to the movable hook.

According to an aspect of the present invention, the coupling unit further includes a coupling manipulator interlocked with the movable hook and allowing the movable hook to be locked to and released from the hook coupling portion.

According to an aspect of the present invention, one of the projection part and the projection holding part includes a projection protruding from a surface, and the other one has a projection groove in a surface thereof.

According to an aspect of the present invention, the supporting unit includes a base seated on the installation surface, and a stand standing on the base and coupled with the computer.

According to an aspect of the present invention, the supporting unit further includes a supporting bracket including one of the projection part and the projection holding part.

According to an aspect of the present invention, the supporting unit further includes a supporting bracket having one of the projection part and the projection holding part.

According to an aspect of the present invention, the computer system further includes a first tilting supporter hingedly supporting the display main body with respect to a first axis and allowing the screen to move close to and away from a top surface of the computer main body. A second tilting supporter hingedly supports the display main body with respect to a second axis spaced from the first axis and allows the display main body to move close to and away from a bottom surface of the computer main body.

According to an aspect of the present invention, the computer system further includes a hinge bracket connecting the computer main body with the display main body, and is rotatable against the computer main body with respect to the second axis.

According to an aspect of the present invention, the second tilting supporter includes a second hinge shaft provided in one of the hinge bracket and the computer main body. A second hinge shaft accommodating part is provided in the other one of the hinge bracket and the computer main body and rotatably accommodates the second hinge shaft.

According to an aspect of the present invention, the computer system further includes a tilting restrictor to allow and restrict tilting operation of the display main body with respect to the second axis. The tilting restrictor includes a locking projection provided in one of the hinge bracket and the computer main body. A projection holder is provided in the other one of the hinge bracket and the computer main body and is adapted to engage the locking projection.

According to an aspect of the present invention, the computer system further includes a locking manipulator interlocked with the locking projection that allows the locking projection to be locked to and released from the projection holder.

According to an aspect of the present invention, the first tilting supporter includes a first hinge shaft connecting the display main body with the hinge bracket. A shaft bracket is disposed in the hinge bracket and rotatably accommodates the first hinge shaft therein.

Other objects, advantages and salient features of the present invention will become apparent from the following detailed description, which, taken in conjunction with the annexed drawings, discloses exemplary embodiments of the present invention.

BRIEF DESCRIPTION OF THE DRAWINGS

The above and other aspects and advantages of the present invention will become apparent and more readily appreciated from the following description of the embodiments, taken in conjunction with the accompany drawings, of which.

Throughout the drawings, like reference numerals will be understood to refer to like parts, components and structures.

DETAILED DESCRIPTION OF EXEMPLARY EMBODIMENTS

Reference will now be made in detail to the exemplary embodiments of the present invention, examples of which are illustrated in the accompanying drawings.

Figure 1:
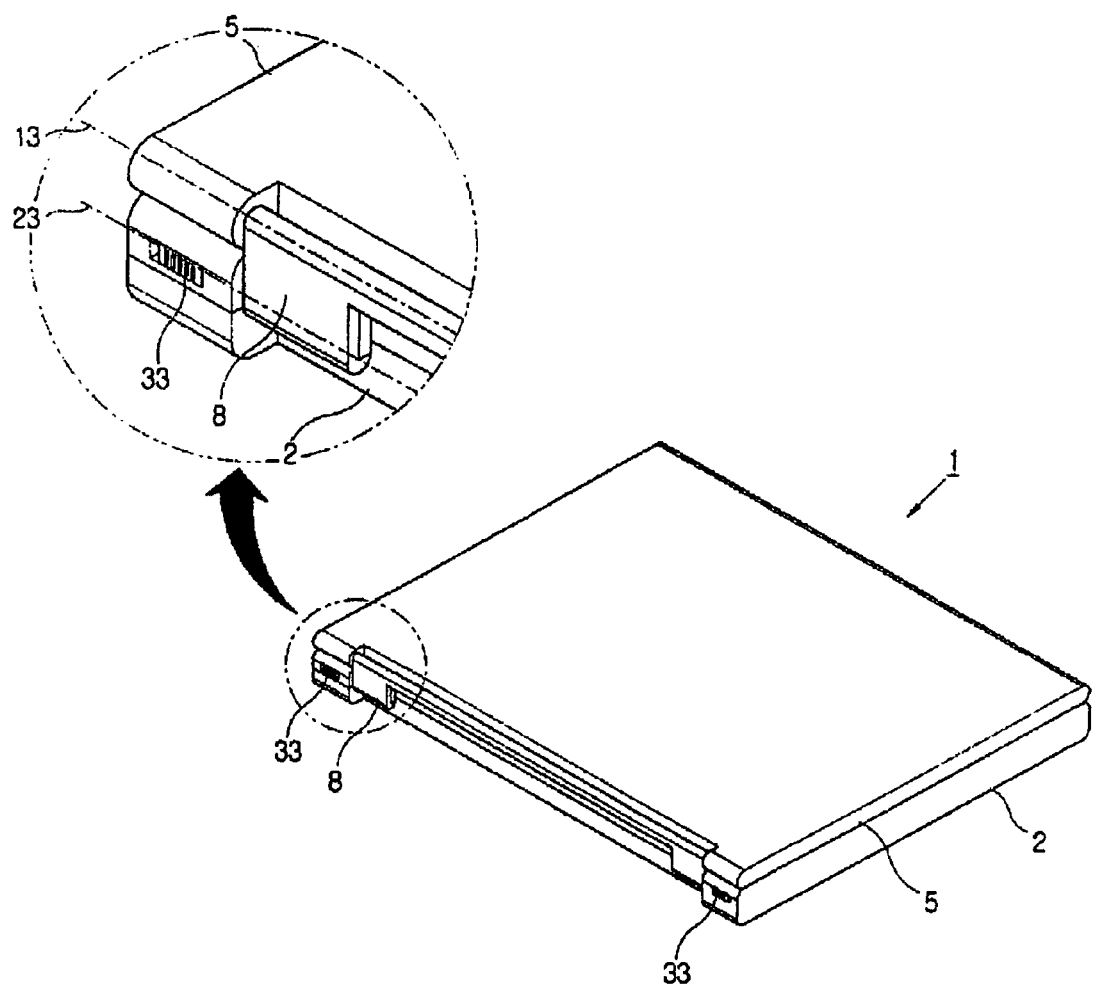
FIG. 1 is a perspective view of a portable computer according to an exemplary embodiment of the present invention with a display tilted at an angle of 0 degrees.
Figure 2:
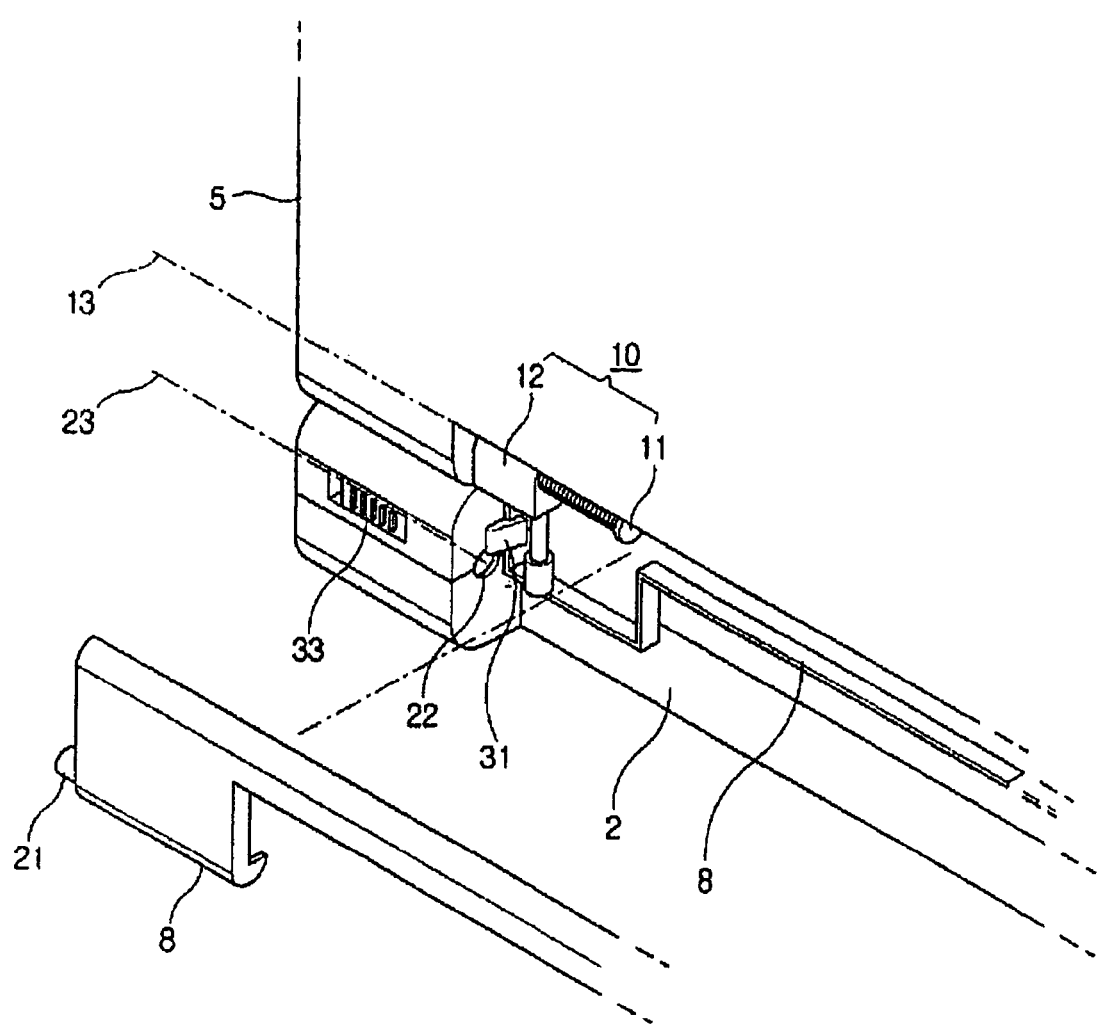
FIG. 2 is an enlarged view of a tilting supporter when the display is tilted at an angle of 90 degrees.

A computer system according to an exemplary embodiment of the present invention includes a portable computer 1, as shown in FIG. 1. As illustrated in FIG. 1, the portable computer 1 includes a computer main body 2, and a display main body 5 having a screen 6 (FIG. 3) to display a picture based on a video signal transmitted from the computer main body 2. The display main body 5 may be tilted against the computer main body 2 with respect to first and second axes 13 and 23 (FIG. 2).

A hinge bracket 8 that is rotatable against the computer main body 2 with respect to the second axis 23 and a locking manipulator 33 that locks and releases the hinge bracket 8 that is rotatable with respect to the second axis 23 are provided in a back portion of the computer 1.

Figure 6:
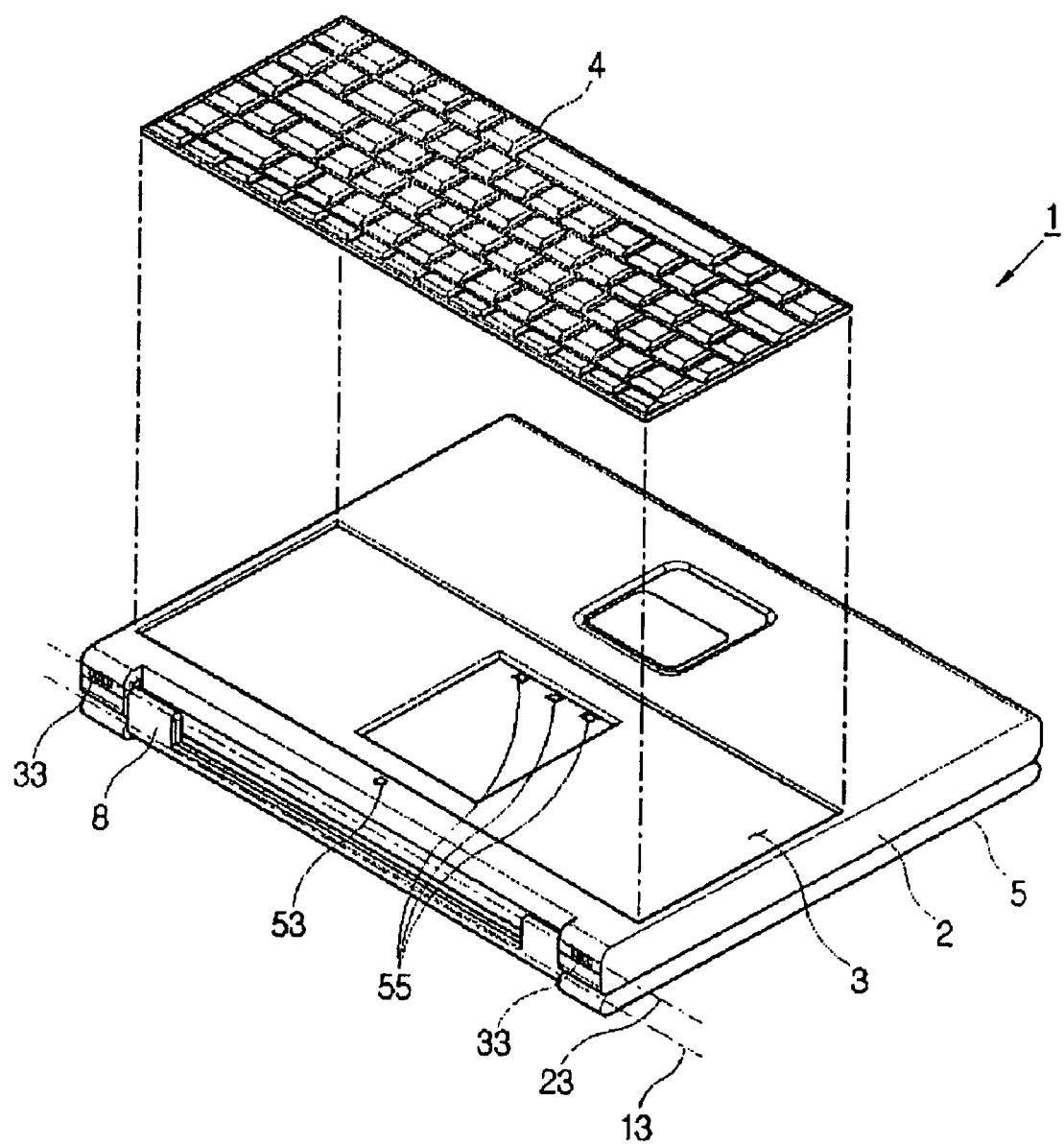
FIG. 6 is a perspective view of the portable computer according to an exemplary embodiment of the present invention with the display tilted at an angle of 360 degrees.

The computer main body 2 includes a plurality of hardware components, such as a main board, a central processing unit (CPU), a random access memory (RAM), and other conventional computer hardware, which are disposed therein. An input unit, such as a keyboard 4, is disposed thereon. The keyboard 4 is detachably accommodated in a keyboard accommodating part 3 recessed on the computer main body 2 (FIG. 6).

Figure 3:
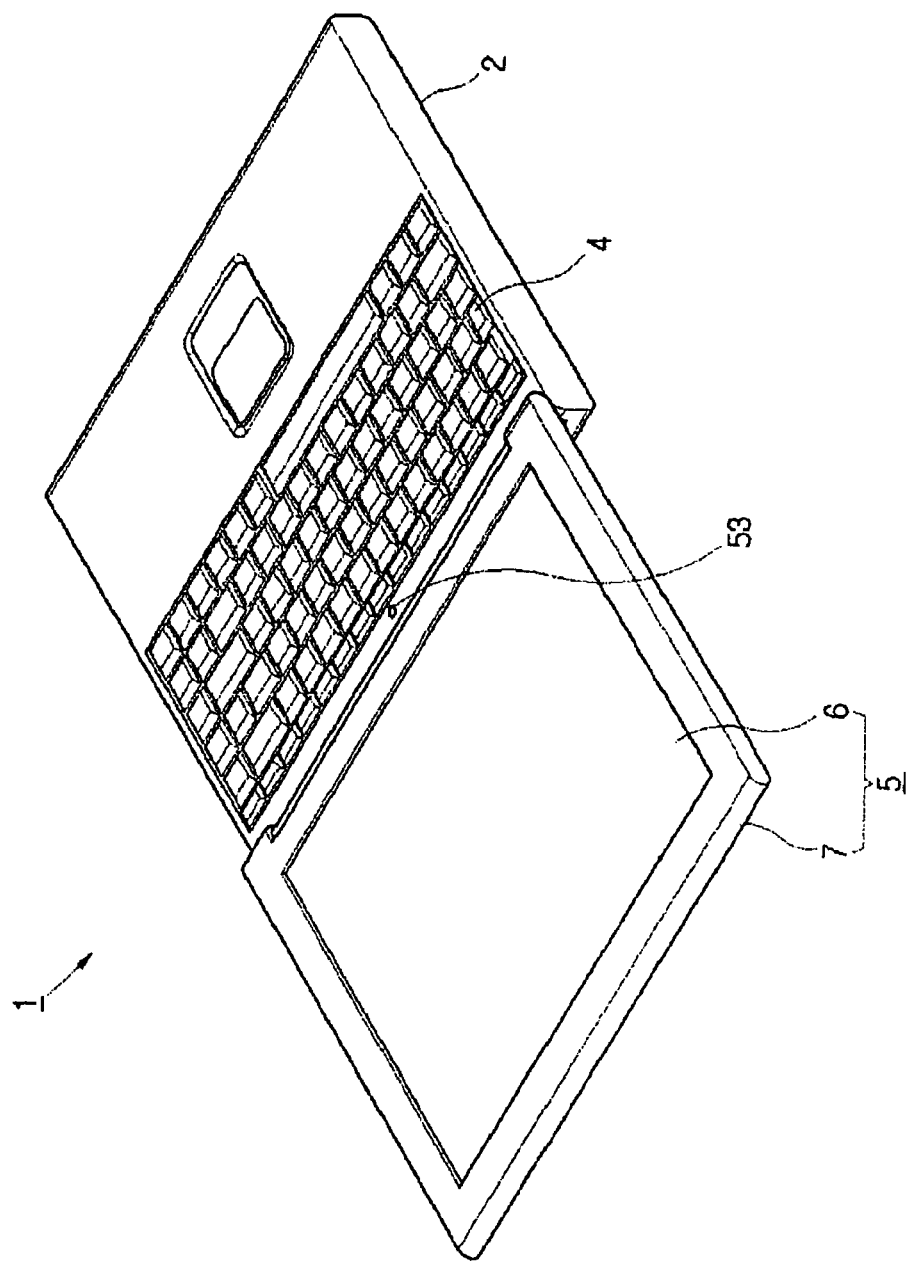
FIG. 3 is a perspective view of the portable computer according to an exemplary embodiment of the present invention with the display tilted at an angle of 180 degrees.

The display main body 5 includes the screen 6 that displays an image, and a casing 7 that supports the screen 6, as shown in FIG. 3. In FIG. 1, the display main body 5 is folded onto the computer main body 2 at an angle of 0 degrees, thereby covering up the screen 6.

The display main body 5 is supported by a tilting supporter 10, 21 and 22 (refer to FIG. 2) and thus may be tilted against the computer main body 2. As shown in FIG. 2, the tilting supporter includes a first tilting supporter 10 hingedly supporting the display main body 5 with respect to the first axis 13 to make the screen 6 move closer to and farther away from a top surface of the computer main body 2, and a second tilting supporter 21 and 22 hingedly supporting the display main body 5 with respect to the second axis 23 to make the display main body 5 move closer to and farther away from a bottom surface of the computer main body 2.

The first tilting supporter 10 supports the display main body 5 to be rotatable against the computer main body 2 within an angle ranging from 0 degrees to 180 degrees. Furthermore, the first tilting supporter 10 includes a first hinge shaft 11 connecting the display main body 5 with the hinge bracket 8 and forming the first axis 13, and a shaft bracket 12 disposed in the hinge bracket 8 and rotatably accommodating the first hinge shaft 11 therein. Thus, the display main body 5 may be tilted or rotated within the angle ranging approximately from 0 degrees to 180 degrees with respect to the first axis 13 of the first hinge shaft 11. The rotation angle of 180 degrees allows the display main body 5 to be opened to a position parallel with the computer main body 2 (refer to FIG. 3).

The second tilting supporter 21 and 22 supports the display main body 5 to be rotatable against the computer main body 2 within an angle ranging from 180 degrees to 360 degrees. Furthermore, the second tilting supporter 21 and 22 includes a second hinge shaft 21 disposed in an end of the hinge bracket 8 and forming the second axis 23 spaced from the first axis 13, and a second hinge shaft accommodating part 22 disposed in the computer main body 2 and rotatably accommodating the second hinge shaft 21. Thus, the display main body 5 may be tilted within the rotation angle ranging approximately from 180 degrees to 360 degrees.

Figure 4A:
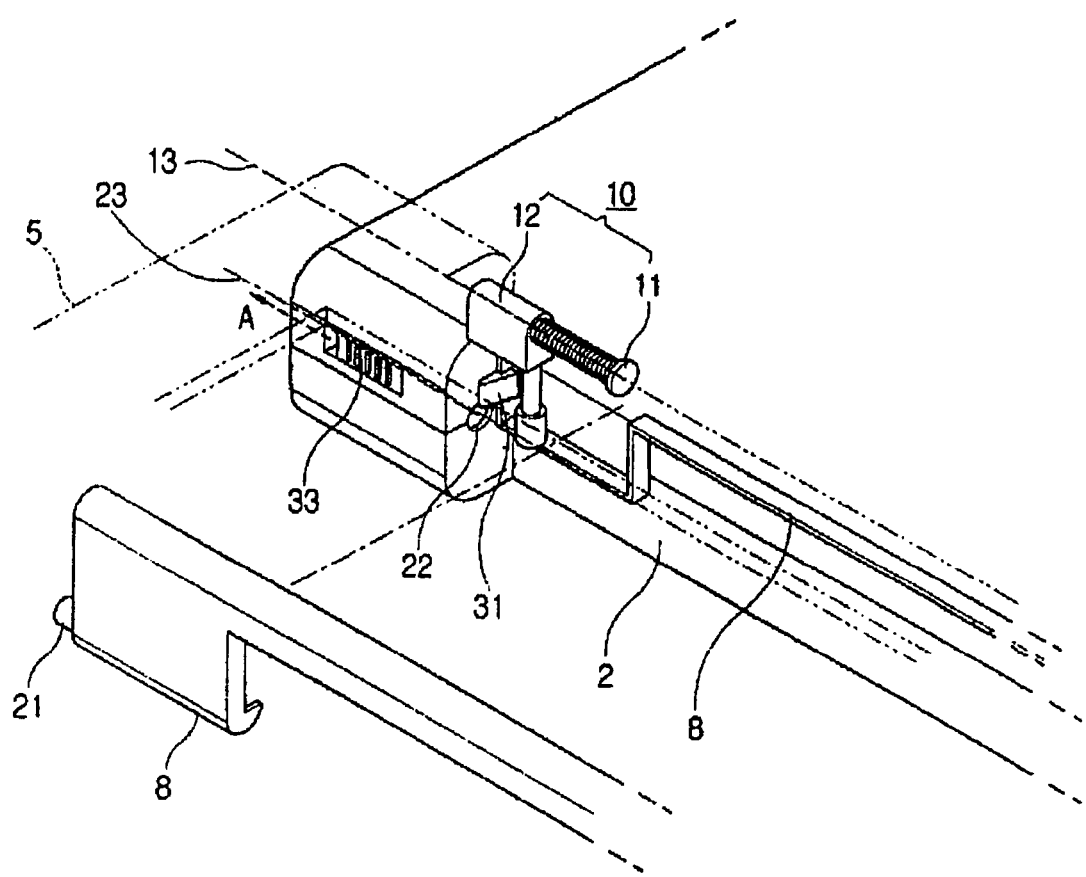
FIGS. 4A and 4B illustrate operations of a tilting restrictor according to an exemplary embodiment of the present invention.
Figure 4B:
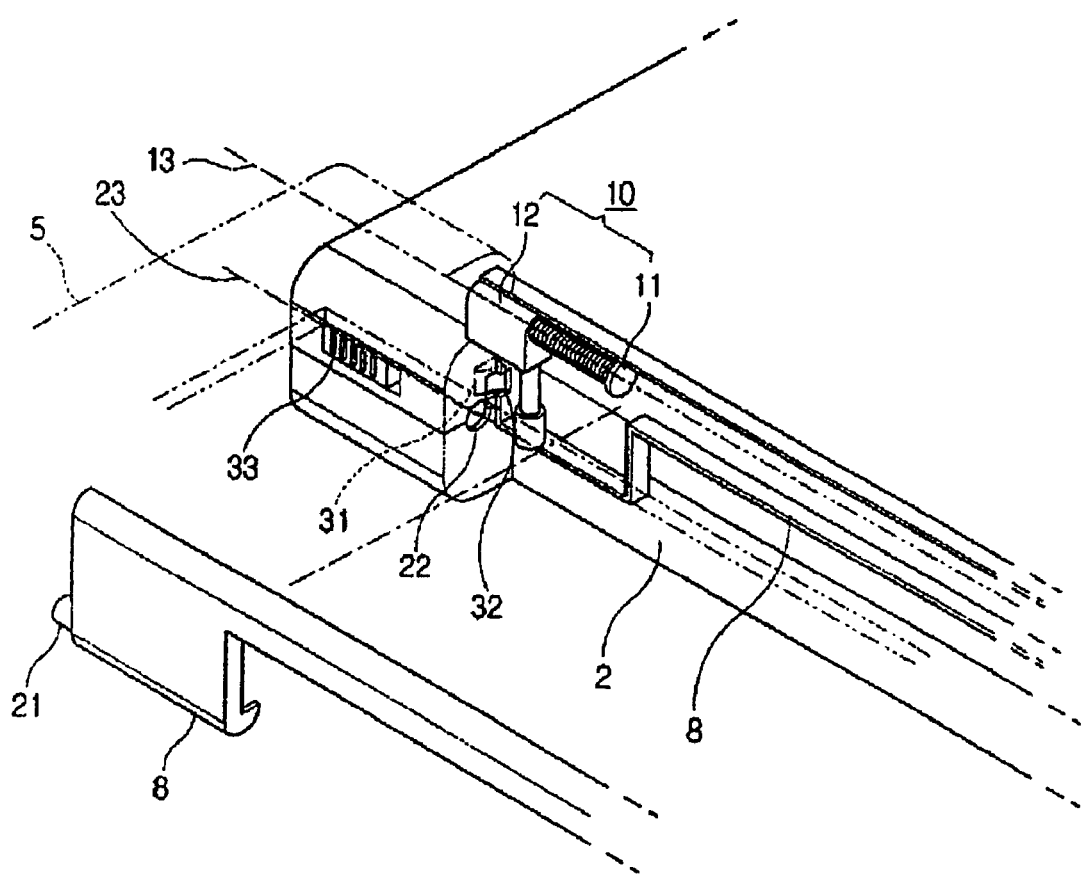

The tilting or rotating operation of the display main body 5 with respect to the second axis 23 is restricted and allowed by a tilting restrictor shown in FIGS. 4A and 4B.

The tilting restrictor includes a locking projection 31 movable relative to the computer main body 2, a projection holder 32 disposed in the hinge bracket 8 and holding the locking projection 31, and the locking manipulator 33 interlocked with the locking projection 31 that allows a user to control the locking projection 31 to be locked to and released from the projection holder 32.

Figure 5:
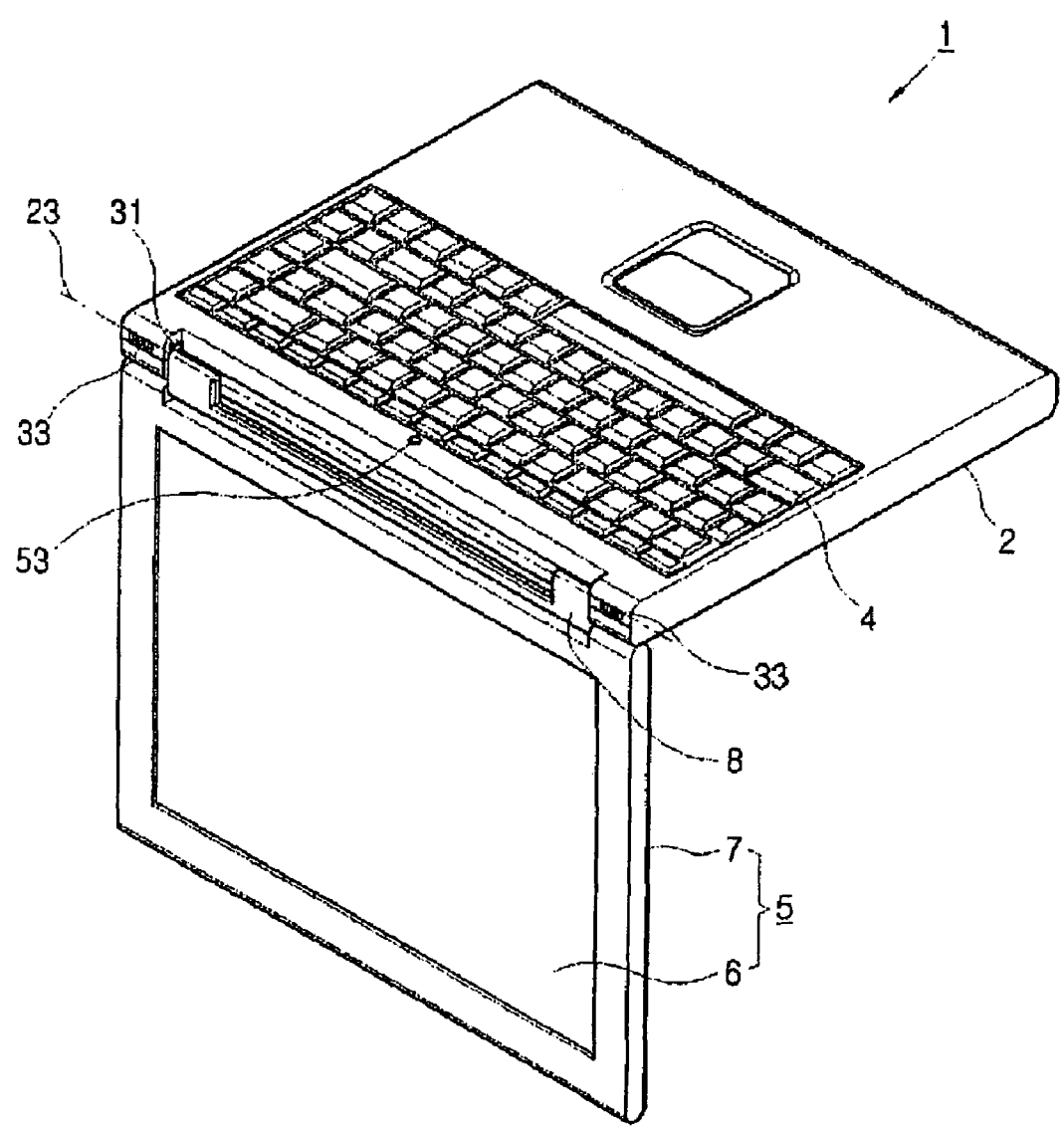
FIG. 5 is a perspective view of the portable computer according to an exemplary embodiment of the present invention with the display tilted at an angle of 270 degrees with respect to a second axis of a second hinge shaft.

When the locking projection 31 is released from the projection holder 32, the display main body 5 may be tilted with respect to the second axis 23, as shown in FIG. 5, about an angle of approximately 360 degrees as shown in FIG. 6. The angle of 360 degrees means a position that the display main body 5 is folded onto the computer main body 2 and exposes the screen 6 to the outside (refer to FIG. 6). The display main body 5 contacts the bottom of the computer main body 2 at the angle of 360 degrees.

Figure 7:
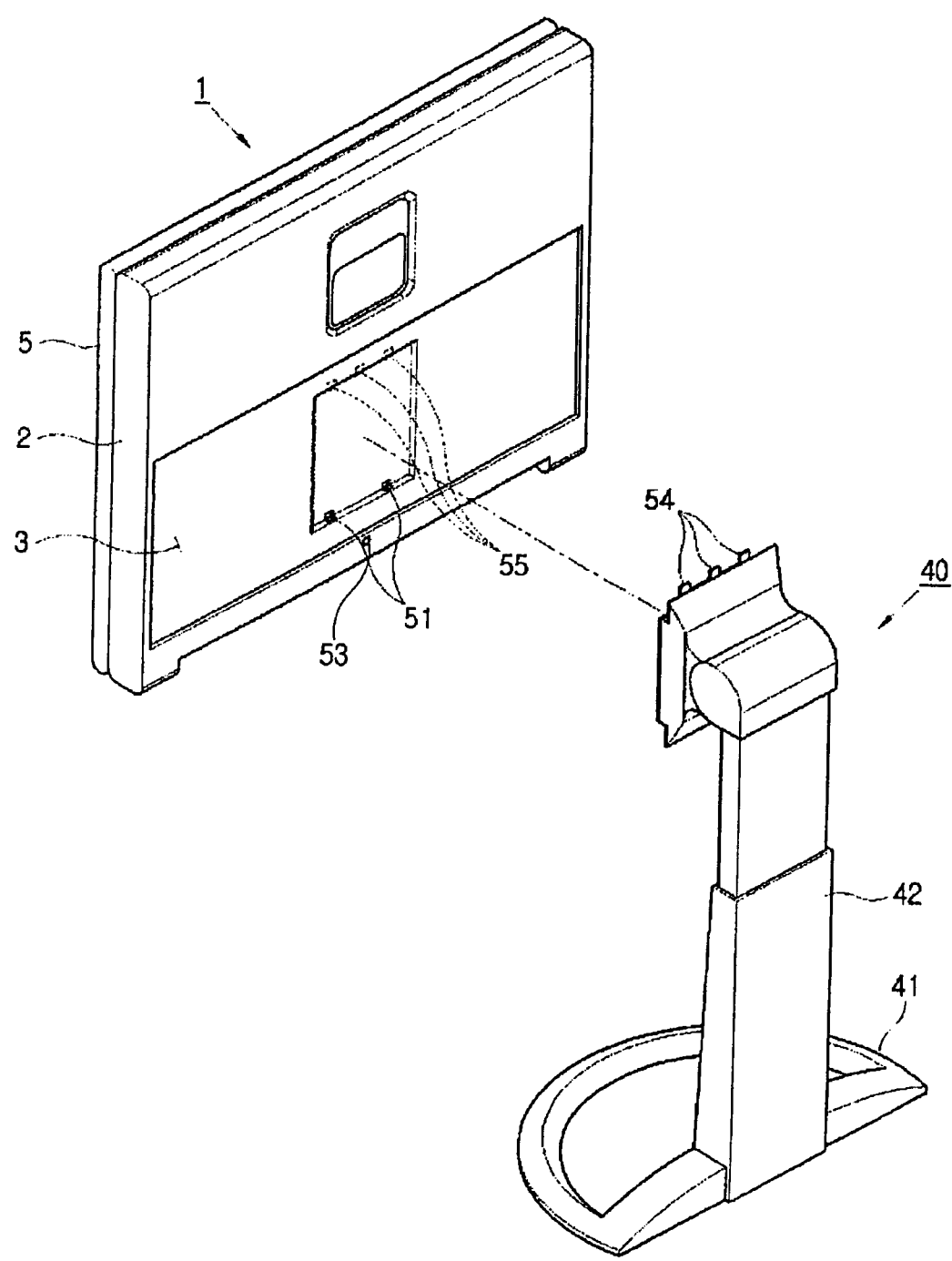
FIG. 7 is a rear exploded perspective view illustrating a disassembled state between the portable computer according to an exemplary embodiment of the present invention and a supporting unit, in which the display is folded onto a computer main body and exposes its screen to the outside.
Figure 8:
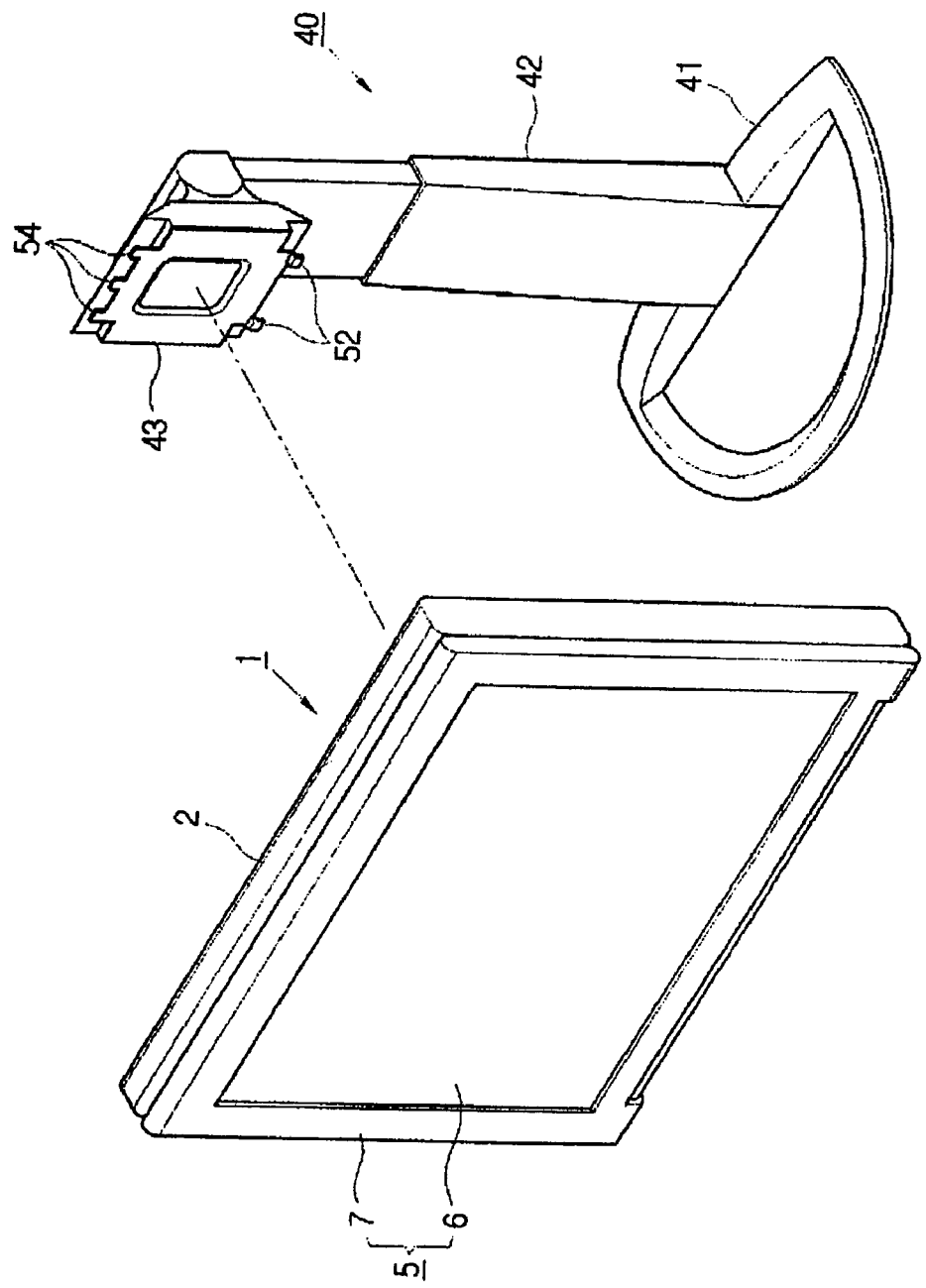
FIG. 8 is an exploded front perspective view of the computer and supporting unit of FIG. 7.

According to an exemplary embodiment of the present invention, the computer system further includes a supporting unit 40 that supports the portable computer 1 against the installation surface, as shown in FIGS. 7 and 8. The portable computer 1 is then in a position that the display main body 5 is folded to contact the bottom surface of the computer main body 2 and the keyboard 4 is detached from the keyboard accommodating part 3, as shown in FIG. 6.

The portable computer 1, from which the keyboard unit 4 is detached from the keyboard accommodating part 3, is installed in the supporting unit 40 through a coupling unit 51, 52, 53, 54 and 55 (FIGS. 7 and 8).

As shown in FIGS. 7 and 8, the supporting unit 40 includes a base 41 disposed on a horizontal surface, such as a table, a stand 42 connected to the base 41, and a supporting bracket 43 supporting the portable computer 1 to the stand 42. The supporting unit 40 is not limited to FIGS. 7 and 8 and may have various shapes. Preferably, the supporting unit 40 allows the portable computer 1 to be lifted upwardly and downwardly, tilted, swiveled and pivoted, so that the portable computer 1 installed in the supporting unit 40 may have various viewing angles.

The coupling unit 51, 52, 53, 54 and 55 includes a movable hook 51 provided on the keyboard accommodating part 3 formed on the top surface of the computer main body 2, a hook coupling portion 52 provided in the supporting bracket 43 and adapted to be coupled with the movable hook 51, a projection groove 55 provided in the keyboard accommodating part 3, and a projection 54 provided in the supporting bracket 43 and adapted to be inserted in the projection groove 55. Furthermore, the coupling unit includes a coupling manipulator 53 interlocked with the movable hook 51 and allowing the movable hook 51 to be locked to and released from the hook coupling portion 52.

The movable hook 51 and the hook coupling portion 52 are described as an example of a projection part and a projection holding part. Furthermore, the projection 54 and the projection groove 55 are described as another example of the projection part and the projection holding part. Also, the projection part may be placed in one of the supporting unit 40 and the keyboard accommodating part 3, and the projection holding part may be placed in the other.

Thus, in the computer system having such a configuration, the portable computer 1 may be used with or without the supporting unit 40, which is described below.

First, the display main body 5 is tilted against the computer main body 2 with respect to the first axis 13 from an angle of approximately 0 degrees (refer to FIG. 1) to an angle of approximately 90 degrees (refer to FIG. 2). In this position, a user may use the portable computer 1 by directly resting the computer main body 2 on an installation surface, such as a table.

Alternatively, the portable computer 1 may be used by connecting to the supporting unit 40 disposed on the installation surface, such as the table.

The display main body 5 may then be tilted against the computer main body 2 with respect to the first axis 13 from an angle of approximately 90 degrees (refer to FIG. 2) to an angle of approximately 180 degrees (refer to FIG. 3). The locking projection 31 of the computer main body 2 is locked to the projection holder 32 of the hinge bracket 8, so that the display main body 5 is prevented from being rotated with respect to the second axis 23 of the second hinge shaft 21 from an angle of approximately 180 degrees to an angle of approximately 360 degrees.

To tilt the display main body 5 with respect to the second axis 23 from an angle of approximately 180 degrees to an angle of approximately 360 degrees, the locking projection 31 is released from the projection holder 32, as shown in FIG. 4B by pushing the locking manipulator 33 in a direction indicated by arrow "A" in FIG. 4A. After releasing the locking projection 31 from the projection holder 32, the display main body 5 may be tilted with respect to the second axis 23 of the second hinge shaft 21 from an angle of approximately 180 degrees (FIG. 4B) to an angle of approximately 360 degrees (FIG. 6) via an angle of 270 degrees (FIG. 5).

The display main body 5 is tilted with respect to the second axis 23 of the second hinge shaft 21 and contacts the bottom surface of the computer main body 2 (FIG. 6). When the display main body 5 is tilted at an angle of approximately 360 degrees, as shown in FIG. 6, the back of the display main body 5 faces and contacts the bottom surface of the computer main body 2.

The keyboard 4 may then be detached from the keyboard accommodating part 3 of the computer main body 2, so that the movable hook 51 and the projection groove 55 are exposed through the keyboard accommodating part 3, as shown in FIG. 7.

As shown in FIGS. 7 and 8, the projection 54 of the supporting bracket 43 is inserted in the projection groove 55 of the computer main body 2, and then the movable hook 51 of the computer main body 2 is engaged with the hook coupling portion 52 of the supporting bracket 43. Therefore, the portable computer 1 is completely installed in the supporting unit 40, wherein the display main body 5 is folded onto the computer main body 2 and thus the screen 6 faces frontwards. Thus, a user may install the portable computer 1 in the supporting unit 40 and then use it on the installation surface, such as the table.

Alternatively, when a user wants to separate the portable computer 1 from the supporting unit 40, a user may push the coupling manipulator 53 to release the movable hook 51 of the computer main body 2 from the hook coupling portion 52 of the supporting bracket 43, thereby easily separating the portable computer 1 from the supporting unit 40.

According to an exemplary embodiment of the present invention, the display main body 5 is folded to expose the screen 6 to the outside and thus the portable computer 1 may be installed in the supporting unit 40 seated on the installation surface, such as the table, so that the portable computer is usable for both its original purpose and for a desktop purpose, thereby enhancing the utility of the portable computer 1.

Furthermore, the portable computer 1 is conveniently separated from the supporting unit 40 by the coupling manipulator 53.

As described above, the exemplary embodiments of the present invention provide a computer system in which a display may be folded to expose its screen to the outside and then the computer system may be connected to a supporting unit, thereby enhancing the utility of the computer system.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A computer system, comprising:
 a computer including
  a computer main body formed with a keyboard accommodating part that detachably accommodates a keyboard therein; and
  a display main body having a screen that displays an image thereon and is foldable against the computer main body; and
 a supporting unit detachably coupled to the keyboard accommodating part that supports the computer on an installation surface in a position that the display main body of the computer is folded onto the computer main body and exposes the screen to the outside.

2. The computer system according to claim 1, wherein a coupling unit detachably couples the computer to the supporting unit, the coupling unit including
 a projection part provided in one of the supporting unit and the keyboard accommodating part; and
 a projection holding part provided in the other one of the supporting unit and the keyboard accommodating part adapted to be coupled to the projection part.

3. The computer system according to claim 2, wherein one of the projection part and the projection holding part includes a movable hook movable between a locking position and a releasing position, and
 the other one includes a hook coupling portion adapted to be coupled to the movable hook.

4. The computer system according to claim 3, wherein the coupling unit includes
 a coupling manipulator interlocked with the movable hook that allows the movable hook to be locked to and released from the hook coupling portion.

5. The computer system according to claim 3, wherein one of the projection part and the projection holding part has a projection protruding from a surface thereof, and
 the other one has a projection groove formed in a surface thereof adapted to receive the projection part.

6. The computer system according to claim 1, wherein the supporting unit includes
 a base disposed on the installation surface; and
 a stand connected to the base and coupled to the computer.

7. The computer system according to claim 6, wherein the supporting unit includes
 a supporting bracket having one of the projection part and the projection holding part.

8. The computer system according to claim 5, wherein the supporting unit includes
 a base disposed on the installation surface; and
 a stand connected to the base and coupled to the computer.

9. The computer system according to claim 8, wherein the supporting unit includes
 a supporting bracket having one of the projection part and the projection holding part.

10. The computer system according to claim 1, wherein
 a first tilting supporter hingedly supports the display main body with respect to a first axis and allows the screen to move closer to and farther away from a top surface of the computer main body; and
 a second tilting supporter hingedly supports the display main body with respect to a second axis spaced from the first axis and allows the display main body to move closer to and farther away from a bottom surface of the computer main body.

11. The computer system according to claim 10, wherein a hinge bracket connects the computer main body with the display main body and is rotatable against the computer main body with respect to the second axis.

12. The computer system according to claim 11, wherein the second tilting supporter includes
 a second hinge shaft provided in one of the hinge bracket and the computer main body; and
 a second hinge shaft accommodating part provided in the other one of the hinge bracket and the computer main body and rotatably accommodating the second hinge shaft.

13. The computer system according to claim 12, wherein a tilting restrictor allows and restricts tilting operation of the display main body with respect to the second axis, the tilting restrictor including
 a locking projection provided in one of the hinge bracket and the computer main body; and
 a projection holder provided in the other one of the hinge bracket and the computer main body and adapted to engage the locking projection.

14. The computer system according to claim 13, wherein a locking manipulator interlocks with the locking projection and allows the locking projection to be locked to and released from the projection holder.

15. The computer system according to claim 11, wherein the first tilting supporter includes
 a first hinge shaft connecting the display main body with the hinge bracket; and
 a shaft bracket placed in the hinge bracket and rotatably accommodating the first hinge shaft therein.

16. The computer system according to claim 10, wherein the display main body is adapted to rotate about the first axis between approximately 0 and 180 degrees.

17. The computer system according to claim 16, wherein the display main body is adapted to further rotate about the second axis between approximately 180 and 360 degrees.

* * * * *